2,964,509

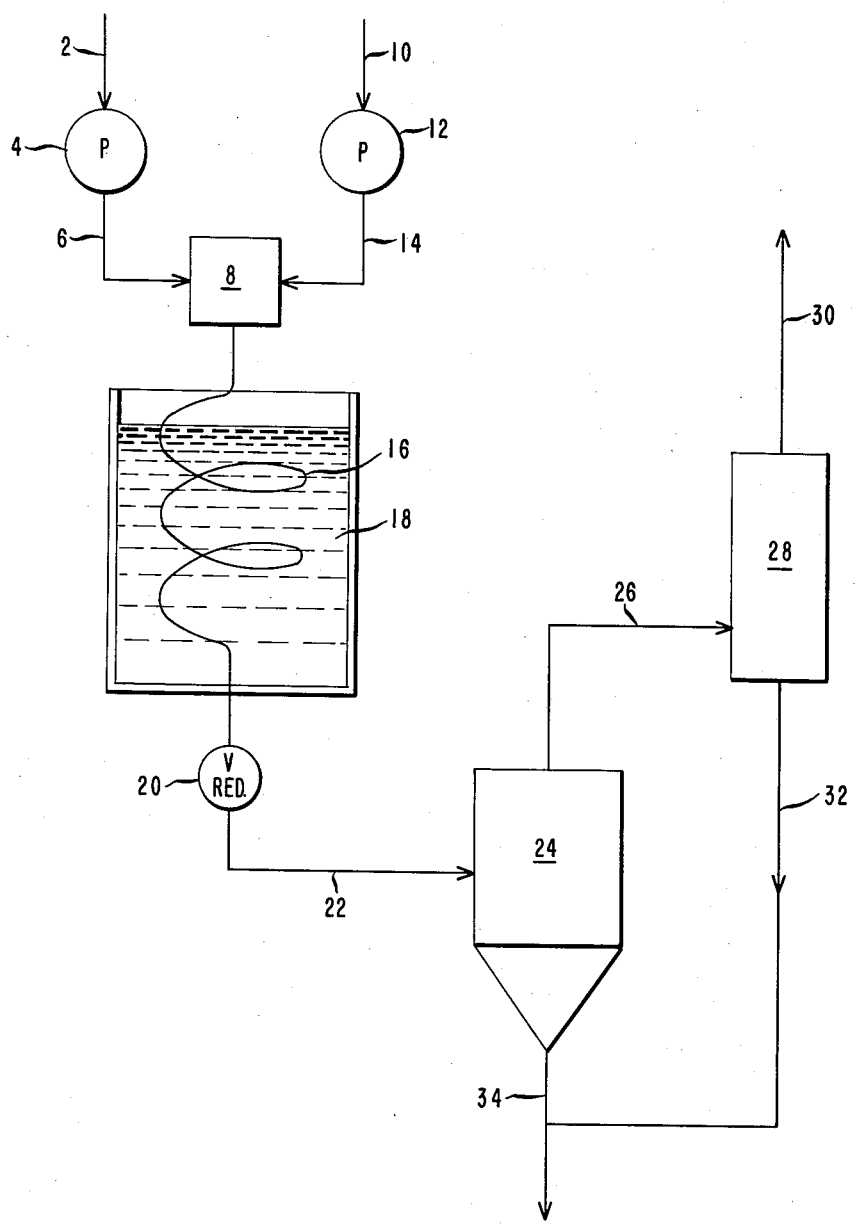

PROCESS FOR CHLORINATION OF OLEFINE POLYMERS

David M. Hurt, Wilmington, Del., assignor to E. I. du Pont de Nemours and Company, Wilmington, Del., a corporation of Delaware Filed Oct. 16, 1956, Ser. No. 616,233

11 Claims. (Cl. 260—88.2)

This invention relates to a process for the chlorination of olefine polymers and particularly to a novel continuous process therefor conducted under conditions such as to yield highly homogeneous chlorinated products.

It is known that valuable products can be made by the chlorination and chlorosulfonation of high molecular weight olefine polymers, such as solid polyethylenes. For example, chlorosulfonated normally solid polymers of ethylene, which contain 25% to 40% chlorine and 0.4% to 3.0% sulfur, can be readily cured to form fully elastic products which have exceptional resistance to attack by oxygen, ozone, and corrosive chemicals. Usually, the chlorosulfonated polymers are manufactured commercially by a two-step process; first chlorinating the polymer to replace hydrogen by chlorine and then reacting the chlorinated polymer with a mixture of chlorine and sulfur dioxide to introduce chlorosulfonic (—SO$_2$Cl) groups into the chlorinated polymer accompanied by some chlorination, both steps being conducted by batch processes.

Material economies and other valuable advantages would be obtained by carrying out either or both of those reactions by a continuous process or processes. However, it has been found that, when it is attempted to employ continuous processes by the known procedures for continuously treating a liquid with a gas, as for example by passing a solution of the olefine polymer with chlorine or a mixture of chlorine and sulfur dioxide through a tubular reactor under turbulent flow conditions, the products are greatly inferior in many of their physical properties to chlorinated and chlorosulfonated olefine polymers of the same molecular weight and same elemental composition made by the commercial batch processes. The same inferior results are obtained when the reaction is carried out continuously in a series of cascading, agitated reaction kettles.

It has been found that the inferior properties of the products obtained by the above mentioned continuous processes are due to the fact that such products are very heterogeneous, that is, they are mixtures of products of widely different chlorine content. In other words, those continuous processes do not subject all of the polymer to the same degree of reaction, whereby some of the polymer is highly chlorinated and/or chlorosulfonated and other material amounts of the polymer are only slightly chlorinated and/or chlorosulfonated. On the other hand, the batch processes produce highly homogeneous products, i.e., products in which substantially all of the polymer has been chlorinated and/or chlorosulfonated to nearly the same degree.

It is an object of this invention to provide a novel continuous process for the chlorination of high molecular weight olefine polymers. Another object is to provide a continuous process for the chlorination of high molecular weight olefine polymers under a novel combination of conditions which produce chlorinated products having properties and a high degree of homogeneity comparable to corresponding products obtained by the commercial batch processes. Other objects will appear hereinafter.

The above and other objects are accomplished by this invention which comprises mixing a solution of an olefine polymer having a molecular weight of at least 10,000 in an inert organic solvent with chlorine in such proportions that the mixture contains between 2% and 20% by weight of the polymer and from about 22 to about 133 parts by weight of chlorine to each 100 parts by weight of the polymer and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

When the process is operated under these conditions, the chlorinated polymer products obtained thereby are highly homogeneous, being equal or superior in this respect to corresponding chlorinated olefine polymers of the same composition made by the known batch processes, and have corresponding valuable and beneficial physical and chemical properties. At the same time, the well known advantages of continuous processes over batch processes are obtained.

The olefine polymers, which can be chlorinated by the process of this invention, have a molecular weight of at least 10,000 and are normally solid. They are polymers of olefines only and consist of homopolymers of a single olefine, such as polyethylene, and copolymers of two or more olefines. The term "olefine" is employed in its strict sense to mean an unsaturated open chain aliphatic hydrocarbon of the ethylene series whose only unsaturation is a single ethylenic double bond and has the formula C$_n$H$_{2n}$. While the process of this invention is illustrated specifically with polyethylene, it and the principles and conditions set forth herein are applicable similarly to the homopolymers and the copolymers of all olefines with like advantages. However, the preferred olefines are those which are terminally unsaturated and contain 2–6 carbon atoms, represented by ethylene, propylene, α-butylene, iso-butylene, 1-pentene, 2-methyl-1-butene, 3-methyl-1-butene, 1-hexene, 2,3-dimethyl-1-butene, 3,3-dimethyl-1-butene, 2-ethyl-1-butene, and the like. The most preferred olefine polymers are the polyethylenes and the copolymers of ethylene with 10% to 60% by weight of propylene.

The reaction is carried out with a mixture of the reactants, the olefine polymer and the chlorine, dissolved in an inert organic solvent. Suitable solvents include carbon tetrachloride, chloroform, trichloroethylene, tetrachloroethane, etc., carbon tetrachloride being preferred. It is essential that such mixture be formed prior to its introduction into the reactor and such mixture should be completely uniform. Otherwise, products of the desired homogeneous composition will not be obtained. Such mixture may be formed in any desired manner, usually at a temperature at which the reaction is slow or does not occur, preferably at room temperature or below. Most conveniently, it is formed by mixing a solution of chlorine with a solution of the polymer in the solvent.

It is also essential that the mixture be caused to flow through a tubular reactor under conditions of viscous laminar (stream-line) flow while subjecting it to reaction conditions until the reaction is complete. In other words, the flow of the mixture through the reactor must be such that there is little or no mixing of the more rapidly flowing portions of the mixture at or nearer the center of the tube with the more slowly flowing portions at or nearer to the wall of the tube. Such type of flow requires that the reactor tube be of uniform bore without sharp bends and have a smooth interior wall free from obstructions. Turbulence or other significant mixing of the mixture within the reactor tube results in heterogeneous products of inferior properties.

Conditions of flow, depending upon the tube diameters and the velocity, viscosity and density of the liquid, are expressed conventionally in Reynold's numbers. See the Encyclopedia of Chemical Technology by Kirk and Othmer, vol. 6, page 626. Turbulent flow occurs at Reynold's numbers of at least 2000. Therefore, the flow of the mixture through the reactor tube will be at Reynold's numbers less than 2000, usually less than 500 and preferably of the order of about 30 or less. Preferably, for practical purposes, the reactor tube will have an interior diameter not greater than 1 inch and the average velocity of the mixture through the tube will not exceed one foot per second.

The mixture must contain the polymer in a concentration between 2% and 20% by weight of the mixture. This provides mixtures which have a sufficient viscosity so that radial diffusion of the chlorine will not take place in the reactor to any significant extent and yet are sufficiently fluid for ready flow through the reactor. Less viscous mixtures permit significant radial diffusion of the chlorine and produce heterogeneous products of inferior properties. Also, the viscous mixtures facilitate maintaining the necessary viscous laminar flow and decrease the tendency for turbulence and mixing within the reactor.

The most valuable chlorinated olefine polymers contain from about 10% to about 40% by weight of chlorine, preferably about 25% to about 40%. It is essential that the proportion of chlorine, in the mixture introduced into the reactor tube, correspond to that theoretically required to produce chlorinated polymer of the desired chlorine content and that the mixture be retained in the reactor tube until substantially all of the chlorine has reacted. Significantly excessive proportions of chlorine or significantly shorter residence times in the reactor tube result in heterogeneous products of inferior properties. Since the reaction involves the replacement of hydrogen atoms of the polymer by chlorine atoms and the formation of HCl as a by-product, the theoretical amount of chlorine will be twice that which is to be introduced into the polymer. Thus, the mixture to be introduced into the reactor will contain from about 22 to about 133 parts of chlorine for each 100 parts by weight of olefine polymer in order to produce chlorinated polymer containing from about 10% to about 40% by weight of chlorine, and preferably from about 68 to about 133 parts of chlorine to 100 parts of olefine polymer in order to produce chlorinated polymer containing from about 25% to about 40% by weight of chlorine.

The reaction is advantageously carried out at temperatures in the range of about 70° C. to about 225° C., preferably from about 80° C. to about 210° C. At materially lower temperatures, the reaction becomes too slow for efficient operation. There is a tendency for decomposition at significantly higher temperatures. The reaction rate increases with increase in temperature. Also, the higher temperatures, within the disclosed range, are preferred with the less soluble polymers because they are more soluble at such higher temperatures. Because of poor heat transfer through the viscous solutions, the reaction is largely adiabatic in reaction tubes of large diameters. For example, when polyethylene is chlorinated to give a product containing 25% chlorine at a starting temperature of 75° C., a 10% solution of polyethylene in carbon tetrachloride will heat to 145° C. under adiabatic conditions, and a 20% solution will heat to 210° C.

It is preferred to carry out the process in the presence of a free-radical catalyst in the liquid mixture. The azonitrile, such as those disclosed by Ernsberger in Patent No. 2,503,252, are most preferred.

The mixture in the reactor must be maintained at a pressure sufficient to keep all of the normally gaseous ingredients (chlorine and hydrogen chloride) of the reacting mixture completely in solution in the mixture. This pressure, for a mixture producing chlorinated polyethylene containing 25% chlorine, is about 400 pounds per square ing gauge (p.s.i.g.) at 80° C. for a 10% polyethylene solution and about 2,500 p.s.i.g. at 210° C. for a 20% polyethylene solution. Failure to maintain such pressure in the reactor, i.e., to maintain the normally gaseous ingredients in solution, results in heterogeneous products of inferior properties.

As stated heretofore the residence time of the mixture in the reactor tube must be sufficient for substantially complete reaction of the chlorine. The mixture in the center of the tube flows at twice the average for all of the mixture, i.e., is in the reactor tube only about half as long as the average. Thus, the residence time must be sufficient for substantially complete reaction of the chlorine in this fastest moving portion of the mixture, and may be exceeded considerably without bad effects. This residence time is dependent also on the amount of chlorine to be incorporated in the polymer, the reaction temperature employed, and the presence or absence of a catalyst and its efficiency. Normally, the residence time will be from about 2 to about 10 minutes. Usually, this requires a reactor tube having a length of from about 30 to about 150 feet, but it may be considerably longer.

The reaction mass is discharged from the reactor tube and the pressure released, whereby the hydrogen chloride and part of the solvent are vaporized and the solution is cooled. The solution is continuously separated from the vapors and may be treated in various ways. The solvent may be removed from the chlorinated polymer by distillation, evaporation, or other conventional methods. The solution may be put to known uses. Usually, the solution will be treated with chlorine and sulfur dioxide, or other chlorosulfonation agents, by known methods to introduce chlorosulfonic (—SO$_2$Cl) groups into the chlorinated polymer. The chlorosulfonation of the chlorinated polymer may be carried out similarly to the chlorination process of this invention; that is, by mixing the solution with the chlorosulfonating agents and passing that mixture through a similar tubular reactor under conditions of viscous laminar flow while subjecting it to a temperature of from 20° C. to about 50° C. and a pressure sufficient to maintain the ingredients of the reacting mixture entirely in the liquid phase, usually about 500 p.s.i.g., until substantially all of the chlorine has reacted, usually a residence time of 10 to 50 minutes in a reactor tube about 50 to about 200 feet long.

This invention may be more clearly understood by reference to the accompanying drawing, which illustrates diagrammatically equipment adapted for carrying out the preferred embodiments of this invention. A solution of the polymer in an inert organic solvent, e.g., carbon tetrachloride, from supply line 2 is delivered continuously by pump 4 through line 6 into a mixing chamber 8. Simultaneously, a solution of chlorine in the same solvent from supply line 10 is delivered continuously by pump 12 through line 14 into the mixing chamber 8. The mixture from chamber 8 is then passed through the tubular reactor 16 immersed in a heating bath 18 for maintaining the reactor at the desired reaction temperature.

As shown, the tubular reactor 16 is in the form of a coiled pipe free of obstructions and sharp bends, having a smooth interior wall of uniform bore, and preferably having an internal diameter not greater than one inch. The tubular reactor will be constructed of a material which will withstand the temperatures and pressures involved and which is inert to the ingredients of the reacting mixture, that is, of a material that is not seriously corroded by chlorine, hydrogen chloride, etc., such as nickel, Inconel, Monel, stainless steel, platinum, and the like. Also, the tubular reactor must be of sufficient length to provide a residence time sufficient for completion of the reaction therein. Convenient lengths for the tubular reactor are in the range of about 30 to about 100 feet.

The reaction mass from the tubular reactor is passed through a reducing valve 20 and line 22 into an expansion chamber 24 which, as shown, is in the form of a cyclone separator. Thereby, the pressure on the reaction mixture is released, and most of the hydrogen chloride and some of the solvent are vaporized and separated from the solution of the chlorinated product. The solution of the chlorinated product is discharged through line 34 to storage, or to a system for recovering the chlorinated product from the solvent, or for further treatment or use, as desired. The vapors from the chamber 24 are passed through line 26 to the condenser 28 in which the solvent is condensed and the hydrogen chloride passes off through line 30 to a suitable recovery system therefor (not shown). The condensed solvent will be discharged from the condenser 28 through line 32, and usually is added to the solution of the chlorinated product as shown.

In order to more clearly illustrate this invention, a preferred mode of carrying it into effect, and the advantageous results to be obtained thereby, the following example is given in which the proportions are by weight except where otherwise specifically indicated.

EXAMPLE

The equipment shown in the drawings was used in which the tubular reactor 16 was a 50 foot coil of nickel tubing having an inside diameter of 0.12 inch maintained at a temperature of about 83° C. The reactor tube therefor had a volume of 7.46 cu. in. or 122.3 ml. A solution, containing 5.0% of polyethylene having a molecular weight of about 20,000 and 0.005% of $\alpha,\alpha'$-azodiisobutyronitrile in carbon tetrachloride, was fed continuously into the mixing chamber 8 at a pressure of about 300 p.s.i.g. and at a rate of 14.7 grams per minute. Simultaneously, a 5.2% solution of chlorine in carbon tetrachloride was fed continuously into the mixing chamber 8 at a pressure of about 300 p.s.i.g. and at a rate of 9.65 grams per minute and mixed with the polymer solution. The mixture was continuously passed through the reactor at a rate corresponding to the combined rate at which the solutions were fed to the mixing chamber, i.e., at a Reynold's number of about 30, at an initial pressure of about 300 p.s.i.g. The average residence time was about 5 minutes. The reaction mass was discharged from the reactor tube at a pressure of about 200 p.s.i.g., i.e., the pressure drop through the reactor was about 100 pounds.

After leaving the reactor, the pressure on the reaction mass was reduced to about atmospheric pressure, liberating almost all of the hydrogen chloride formed in the chlorination reaction and vaporizing with it part of the carbon tetrachloride. The vapors of HCl and CCl₄ were separated from the carbon tetrachloride solution of the chlorinated polyethylene in the cyclone separator 24 and then passed through the water-cooled condenser 28, which separated most of the carbon tetrachloride from the vapors. The hydrogen chloride was almost free of chlorine, indicating that the reaction was substantially complete. The chlorinated polyethylene, isolated from its solution in carbon tetrachloride, contained about 25% chlorine.

The relative homogeneity of chlorinated polymer products, obtained from a particular olefine polymer and having substantially the same chlorine content, can be determined quantitatively by the relative stiffness and the relative ability to absorb olive oil of pressed sheets of the products. Their stiffness, as determined by the Tinius-Olsen method (ASTM D-747-50), increases with decrease in the homogeneity of the products. The absorption of olive oil by the products decreases with decrease in the homogeneity of the products. Since no perfectly homogeneous chlorinated products of the kind to which this invention relates are known, comparison is made with the most nearly homogeneous materials available, namely those made by the known batch process, as "standards."

The homogeneity of the product of the preceding examples was determined by comparing pressed sheets thereof with pressed sheets of a "standard" chlorinated polyethylene of the same chlorine content (25%) which was prepared by the usual batch process. The results are shown in Table I. The stiffness (Tinius-Olsen, ASTM D-747-50) is given in pounds per square inch, and the relative degree of homogeneity is expressed quantitatively by calculating the percentage relation that the stiffness of the product of the example bears to the stiffness of the "standard." The oil absorption is expressed as volume percent increase after immersion in olive oil for 44 hours at 25° C., and the relative degree of homogeneity is expressed quantitatively by calculating the percentage relation that the oil absorption of the product of the example bears to the oil absorption of the "standard."

Table I

|  | Stiffness | Oil Absorption |
|---|---|---|
| "Standard" | 750 | 2.6 |
| Example | 760 | 3.4 |
| Percent of "Standard" | 101 | 130 |

Thus, the stiffness test shows that the product of the example is substantially as homogeneous as the "standard," while the oil absorption test shows that the product of the example is definitely more homogeneous than the "standard."

By way of contrast, more heterogeneous products show far greater stiffness and much less oil absorption than standard products of the same chlorine content made by the usual batch process. This is shown in the following Table II wherein the stiffness and olive oil absorption of pressed sheets of two blends of known heterogeneity are compared with pressed sheets of standard products, employing the same test procedures that were used in connection with Table I. Standard A contained 28.3% chlorine. Blend A contained an average of 28.3% chlorine and was prepared by blending equal amounts of two chlorinated polyethylenes containing 25% and 31.5% chlorine, respectively, each being a product of the known batch process. Standard B contained 29.5% chlorine. Blend B contained an average of 29.5% chlorine and is a 1:1 blend of two chlorinated polyethylenes containing 21.5% and 37.5% chlorine, respectively, each being a product of the known batch process.

Table II

|  | Stiffness | Oil Absorption |
|---|---|---|
| Standard A | 250 | 11.0 |
| Blend A | 310 | 4.5 |
| Percent of Standard | 124 | 41 |
| Standard B | 190 | 14.0 |
| Blend B | 520 | 2.1 |
| Percent of Standard | 274 | 15 |

From the data in Table II, it is apparent that the tests are effective to clearly determine even moderate departures from homogeneity in the chlorinated olefine polymers and indicate the relative degrees of homogeneity or heterogeneity of products of the same or comparable chlorine content. In particular, these tests show that the products of greater heterogeneity, i.e., those in which the differences in chlorine content of the ingredients in the products are greater, differ to a larger extent from the standards in stiffness and in oil absorption. All attempts to chlorinate polyethylene by continuous methods which involved agitation of the reacting mixture, e.g., while passing through a reactor tube under turbulent flow conditions, resulted in products which were similar in properties to blends A and B.

It will be understood that the example hereinbefore set forth is given for illustrative purposes solely, and that this invention is not limited to the specific embodiment described therein, but that many variations and modifications can be made as hereinbefore set forth in the general description without departing from the spirit and scope of this invention. For example, the proportions of chlorine, the concentrations of polymer in the solution and the conditions and techniques employed may be widely varied as pointed out in the general description. Also, homopolymers of other olefines and copolymers of any two or more olefines may be substituted for the polyethylene and chlorinated in the same or a similar manner in accord with the principles and procedures hereinbefore described. Likewise, the equipment disclosed is merely illustrative, and may be modified or varied as will be apparent to those skilled in the art.

From the preceding disclosure, it is apparent that this invention provides a continuous process for producing chlorinated olefine polymers which are at least equal in quality and homogeneity to those obtained by the known batch processes. Also, this invention provides a continuous process which consists of a novel combination of steps and conditions which are essential and critical for the successful production of chlorinated olefine polymers of high quality and homogeneity. Therefore, it will be apparent that this invention constitutes a very valuable advance in and contribution to the art.

The embodiments of the invention in which an exclusive property or privilege is claimed are defined as follows:

1. A continuous process for producing highly homogeneous chlorinated olefine polymers containing from about 10% to about 40% by weight of chlorine which comprises mixing a solution of an olefine polymer having a molecular weight of at least 10,000 in an inert organic solvent with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

2. A continuous process for producing highly homogeneous chlorinated olefine polymers containing from about 10% to about 40% by weight of chlorine which comprises mixing a solution of an olefine polymer having a molecular weight of at least 10,000 in an inert organic solvent with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

3. A continuous process for producing highly homogeneous chlorinated olefine polymers containing from about 25% to about 40% by weight of chlorine which comprises mixing a solution of an olefine polymer having a molecular weight of at least 10,000 in an inert organic solvent with chlorine to provide a mixture containing between 2% and 20% by weight of the polymer and from about 68 to about 133 parts by weight of chlorine to each 100 parts by weight of said polymer, and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

4. A continuous process for producing highly homogeneous chlorinated olefine polymers containing from about 25% to about 40% by weight of chlorine which comprises mixing a solution of an olefine polymer having a molecular weight of at least 10,000 in an inert organic solvent with chlorine to provide a mixture containing between 2% and 20% by weight of the polymer and from about 68 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

5. A continuous process for producing highly homogeneous chlorinated homopolymers of ethylene containing from about 10% to about 40% by weight of chlorine which comprises mixing a solution of a homopolymer of ethylene having a molecular weight of at least 10,000 in an inert organic solvent with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

6. A continuous process for producing highly homogeneous chlorinated homopolymers of ethylene containing from about 10% to about 40% by weight of chlorine which comprises mixing a solution of a homopolymer of ethylene having a molecular weight of at least 10,000 in an inert organic solvent with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

7. A continuous process for producing highly homogeneous chlorinated homopolymers of ethylene containing from about 25% to about 40% by weight of chlorine which comprises mixing a solution of a homopolymer of ethylene having a molecular weight of at least 10,000 in an inert organic solvent with chlorine to provide a mixture containing between 2% and 20% by weight of the polymer and from about 68 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

8. A continuous process for producing highly homogeneous chlorinated homoploymers of ethylene containing from about 10% to about 40% by weight of chlorine which comprises mixing a solution of a homopolymer of ethylene having a molecular weight of at least 10,000 in carbon tetrachloride with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

9. A continuous process for producing highly homogeneous chlorinated homopolymers of ethylene containing from about 10% to about 40% by weight of chlorine which comprises mixing a solution of a homopolymer of ethylene having a molecular weight of at least 10,000 in carbon tetrachloride with chlorine to provide a mixture containing between 2% and 20% by weight of the polymer and from about 22 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

10. A continuous process for producing highly homogeneous chlorinated homopolymers of ethylene containing from about 25% to about 40% by weight of chlorine which comprises mixing a solution of a homopolymer of ethylene having a molecular weight of at least 10,000 in carbon tetrachloride with chlorine to provide a mixture containing between 2% and 20% by weight of the polymer and from about 68 to about 133 parts by weight of chlorine to each 100 parts by weight of said polymer, and then flowing the mixture through a tubular reactor under conditions of viscous laminar flow while subjecting the mixture to a temperature of from about 80° C. to about 210° C. and a pressure sufficient to maintain all normally gaseous ingredients of the reacting mixture in solution in the mixture until substantially all of the chlorine has reacted.

11. A continuous process for producing highly homogeneous chlorinated copolymers of ethylene and propylene containing from about 10% to about 40% by weight of chlorine which comprises mixing a solution of a copolymer of ethylene with 10% to 60% of propylene having a molecular weight of at least 10,000 in an inert organic solvent with chlorine to provide a mixture containing between 2% and 20% by weight of the copolymer and from about 22 to about 133 parts by weight of chlorine to each 100 parts by weight of said copolymer, and then flowing the mixture through a tubular reactor under conditions of viscous laminar flow while subjecting the mixture to a temperature of from about 70° C. to about 225° C. and a pressure sufficient to maintain all normally gaseous ingredients of the reacting mixture in solution in the mixture until substantially all of the chlorine has reacted.

References Cited in the file of this patent

UNITED STATES PATENTS

| 2,105,733 | Hass et al. | Jan. 18, 1938 |
| 2,291,574 | Gleason et al. | July 28, 1942 |
| 2,327,705 | Frolich et al. | Aug. 24, 1943 |
| 2,398,803 | Myles | Apr. 23, 1946 |
| 2,503,252 | Ernsberger | Apr. 11, 1950 |
| 2,571,901 | Lawlor | Oct. 16, 1951 |
| 2,748,105 | Becker et al. | May 29, 1956 |

FOREIGN PATENTS

| 481,515 | Great Britain | Mar. 11, 1938 |
| 623,705 | Great Britain | May 20, 1949 |